United States Patent
Kirby

(10) Patent No.: US 8,364,718 B2
(45) Date of Patent: Jan. 29, 2013

(54) COLLABORATIVE BOOKMARKING

(75) Inventor: Christopher W. Kirby, Winnipeg (CA)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 12/262,683

(22) Filed: Oct. 31, 2008

(65) Prior Publication Data

US 2010/0114907 A1    May 6, 2010

(51) Int. Cl.
    G06F 17/30    (2006.01)
(52) U.S. Cl. .......................... 707/802; 707/736
(58) Field of Classification Search ........... 707/999.103, 707/736, 802
    See application file for complete search history.

(56) References Cited

U.S. PATENT DOCUMENTS

| | | | |
|---|---|---|---|
| 6,212,522 B1 | 4/2001 | Himmel et al. | |
| 6,751,621 B1 * | 6/2004 | Calistri-Yeh et al. | 1/1 |
| 7,206,785 B1 | 4/2007 | Stephens | 707/602 |
| 7,664,760 B2 * | 2/2010 | Christian et al. | 707/737 |
| 7,792,868 B2 * | 9/2010 | Finkelstein et al. | 707/798 |
| 7,849,103 B2 * | 12/2010 | Hyatt et al. | 707/792 |
| 8,001,125 B1 * | 8/2011 | Magdalin et al. | 707/737 |
| 8,046,355 B2 * | 10/2011 | Alfonseca et al. | 707/721 |
| 2003/0009338 A1 * | 1/2003 | Kochanski et al. | 704/260 |
| 2004/0178911 A1 * | 9/2004 | Sakamoto et al. | 340/572.4 |
| 2005/0044007 A1 * | 2/2005 | Shitomi et al. | 705/26 |
| 2005/0075917 A1 * | 4/2005 | Flores et al. | 705/8 |
| 2006/0069699 A1 | 3/2006 | Smadja et al. | |
| 2006/0149720 A1 * | 7/2006 | Dehlinger | 707/3 |
| 2006/0242178 A1 * | 10/2006 | Butterfield et al. | 707/100 |
| 2006/0259475 A1 * | 11/2006 | Dehlinger | 707/3 |
| 2006/0294086 A1 * | 12/2006 | Rose et al. | 707/3 |
| 2006/0294192 A1 * | 12/2006 | Mao et al. | 709/213 |
| 2007/0078832 A1 * | 4/2007 | Ott et al. | 707/3 |
| 2007/0106780 A1 * | 5/2007 | Farnham et al. | 709/223 |
| 2007/0118515 A1 * | 5/2007 | Dehlinger | 707/3 |
| 2007/0124208 A1 * | 5/2007 | Schachter et al. | 705/14 |
| 2007/0150487 A1 * | 6/2007 | Christian et al. | 707/100 |
| 2007/0185858 A1 * | 8/2007 | Lu et al. | 707/5 |
| 2007/0208613 A1 * | 9/2007 | Backer | 705/10 |
| 2007/0239778 A1 * | 10/2007 | Gallagher | 707/104.1 |
| 2008/0040674 A1 * | 2/2008 | Gupta | 715/745 |
| 2008/0086496 A1 * | 4/2008 | Kumar et al. | 707/102 |
| 2008/0140679 A1 * | 6/2008 | Deyo et al. | 707/100 |
| 2008/0235216 A1 * | 9/2008 | Ruttenberg | 707/5 |

(Continued)

FOREIGN PATENT DOCUMENTS

WO    WO 00/55741    9/2000

OTHER PUBLICATIONS

Lee, et al., "Tag-GeoTag Correlation in Social Networks", SSM' 08, Oct. 30, 2008, pp. 59-66.*
Xu, et al., "A Comparative Study of Correlation Measurements for Searching Similar Tags", ADMA 2008, pp. 709-716.*

(Continued)

*Primary Examiner* — Phuong Thao Cao
(74) *Attorney, Agent, or Firm* — George R. McGuire; Blaine T. Bettinger; Bond Schoeneck & King

(57) ABSTRACT

A method and system for collaborating tags in a bookmarking system wherein the bookmarking system includes a plurality of tags applied to content items by a plurality of users, the method and system including, examining all the tags that are applied to all the content items, determining whether two tags have been assigned to the same content item, if two tags have been assigned to the same content item, computing the relative strength of each of the two tags with respect to each other.

11 Claims, 2 Drawing Sheets

U.S. PATENT DOCUMENTS

| | | | | |
|---|---|---|---|---|
| 2008/0281790 | A1* | 11/2008 | Prosser et al. | 707/3 |
| 2009/0077025 | A1* | 3/2009 | Brooks et al. | 707/3 |
| 2009/0083278 | A1* | 3/2009 | Zhao et al. | 707/10 |
| 2009/0113281 | A1* | 4/2009 | Close et al. | 715/205 |
| 2009/0150342 | A1* | 6/2009 | Muller et al. | 707/3 |
| 2009/0210814 | A1* | 8/2009 | Agrusa et al. | 715/772 |
| 2009/0234727 | A1* | 9/2009 | Petty | 705/14 |
| 2009/0265631 | A1* | 10/2009 | Sigurbjornsson et al. | 715/716 |
| 2009/0281895 | A1* | 11/2009 | Selinger et al. | 705/14.43 |
| 2009/0281970 | A1* | 11/2009 | Mika et al. | 706/12 |
| 2009/0287674 | A1* | 11/2009 | Bouillet et al. | 707/5 |
| 2009/0327081 | A1* | 12/2009 | Wang et al. | 705/14.66 |
| 2010/0010982 | A1* | 1/2010 | Broder et al. | 707/5 |
| 2010/0030766 | A1* | 2/2010 | Li et al. | 707/5 |
| 2010/0057714 | A1* | 3/2010 | Miedema | 707/5 |
| 2010/0153832 | A1* | 6/2010 | Markus et al. | 715/205 |

OTHER PUBLICATIONS

Cattuto et al., "Semantic Analysis of Tag Similarity Measures in Collaborative Tagging Systems", May 14, 2008, 6 pages, accessed online at <http://arxiv.org/pdf/0805.2045v1.pdf> on Sep. 13, 2012.*

Farooq et al., "Evaluating Tagging Behavior in Social Bookmarking Systems: Metrics and Design Heuristics", ACM, Group'07, Nov. 4-7, 2007, pp. 351-360 (10 pages).*

Deng et al., "Conceptualization of Place via Spatial Clustering and Co-Occurence Analysis", ACM, LBSN'09, Nov. 3, 2009, 8 pages.*

Mike Butcher, Cogenz Social Bookmarking for the Enterprise, http://uk.techcrunch.com/2006/09/13/cogenz-social-bookmarking-for-the-enterprise/ Sep. 13, 2006.

Steve Eisner, Our experience with enterprise tagging terminology, http://www.ihol.org/blog/index.php/2006/05/22/our-experience-with-enterprise-tagging-terminology May 22, 2006.

* cited by examiner

COLLABORATIVE BOOKMARKING

TECHNICAL FIELD

The present invention relates generally to methods and systems for collaborative bookmarking, and particularly to methods and systems for managing a collaborative bookmarking system.

BACKGROUND

Collaborative bookmarking is a growing phenomenon within the world-wide web. Users of a collaborative bookmarking site contribute to the site by associating, or "tagging" uniform resource locators (URLs) for web-accessible content with descriptive phrases and key words, or tags. A tag is a non-hierarchical keyword or term assigned to a piece of information (such as an internet bookmark, digital image, or computer file). This kind of metadata helps describe an item and allows it to be found again by browsing or searching. Tags are chosen informally and personally by the item's creator or by its viewer, depending on the system. On a website in which many users tag many items, this collection of tags becomes a folksonomy, also known as social classification, social indexing or social tagging.

The contributions of the site users is typically displayed as a single page, random arrangement of tags commonly referred to as a tag cloud. This is exemplified by collaborative bookmarking sites such as delicious.com and flickr.com. Further examples of collaborative bookmarking solutions include IBM's Dogear, the Onomi social bookmarking system, and the Cogenz enterprise tagging solution.

Collaborative bookmarking systems used in the corporate environment, such as IBM's dogear and the Onomi bookmarking system, have proven valuable for: 1) providing research analysts with a place to share research findings; 2) fueling expertise finding and user profiling; 3) helping to form and support social networks around interest areas; 4) enhancing the value of other information retrieval and aggregation capabilities on a company's intranet; and 5) influencing or augmenting corporate subject taxonomy strategies.

These systems share a number of common features. They allow individuals to create personal collections of bookmarks and easily share their bookmarks with others. These centrally stored collections can be accessed from web-connected machine. These systems all have the ability to display tag clouds that represent the contributions of all of a collaborative bookmarking site's users. Tags that are explicitly entered by the user for each bookmark allow the individual user to organize and display the collection with meaningful labels. Furthermore, multiple tags allow bookmarks to belong to more than one category, a limitation of traditional hierarchically organized folders found in most web browsers. Although bookmark collections are personally created and maintained, they are typically visible to others. A number of user interface elements allow social browsing of the bookmark space. For example, user names are "clickable" links; clicking on a name reveals the bookmark collection for that user. This allows someone to get a sense of the topics of interest for a particular user. Similarly, tags are also clickable, and when selected will result in a list of all bookmarks that share that tag. This is a useful way to browse through the entire bookmark collection to see if it includes information sources of interest.

These systems also have the ability to display the relative number of contributions and/or activity of contributions by varying the weight, size, color, and style of the fonts used to display tags within a tag cloud. For example, a tag that refers to twice as much content as another tag may be shown using a larger font that the other tag.

Moreover, there are other systems, such as the Mooter search engine, that enable the automated discovery and presentation of related topics within a group of web-accessible content but these rely on automated topic discovery (topics are analogous to tags) through parsing of web content. This results in a narrow set of topics that does not represent the wide variety of viewpoints observed in a social bookmarking solution.

What these systems all lack is the ability to present users with tags that are related to a tag of interest. For example, suppose a user is searching for tags related to the topic of chairs. Current systems have no ability to relate this to the topic of recliners and thus require the user to know that a recliner is a specialization of the general topic of chairs.

SUMMARY

According to one embodiment of the present invention, a method of collaborating tags in a bookmarking system is provided wherein the bookmarking system includes a plurality of tags applied to content items by a plurality of users, the method including, examining all the tags that are applied to all the content items, determining whether two tags have been assigned to the same content item, if two tags have been assigned to the same content item, computing the relative strength of each of the two tags with respect to each other.

In a further aspect of the method, the relative strength is computed by counting the number of occurrences of each of the two tags on all the commonly assigned content items within the bookmarking system, and dividing by the sum total of the number of occurrences of each of the two tags in the entire bookmarking system.

In yet another aspect, the method includes determining the relative strength between all the tags in the bookmarking system that have been assigned to the same content items. The relative strength is computed by counting the number of occurrences of each of two tags on all the commonly assigned content items within the bookmarking system and dividing by the sum total of the number of occurrences of each of the two tags in the entire bookmarking system.

In still a further aspect, the method includes providing a representation of the relative strength between the tags in a bookmarking system. The representation can be provided in a variety of forms. It can include tags having varied size, weight, style, color, or face of font dependent on relative strength of the tags. The representation can include tags having lines disposed between tags of common assignment, wherein the lines have varying width or color to indicate the direction of relationships between tags of common assignment. It can include tags having relationships whose relative strength is above a system or user-defined threshold.

In another embodiment of the invention, a system for collaborating tags in a bookmarking system is provided wherein the bookmarking system includes a plurality of tags applied to content items by a plurality of users, the system including one or more user interfaces, a collaborative bookmarking database linked to the one or more users interfaces, wherein users utilize the one or more user interfaces to apply tags to content items, and a relationship database linked to the collaborative bookmarking database, wherein the relationship database computes the relative strength of each tag applied to the same content item.

In a further aspect of the system, the relative strength is computed by counting the number of occurrences of each of two tags on all the commonly assigned content items within the bookmarking system, and dividing by the sum total of the number of occurrences of each of the two tags in the entire bookmarking system.

In another aspect of the system, the relative strength is computed between all the tags in the bookmarking system that have been assigned to the same content items by counting the number of occurrences of each of two tags on all the commonly assigned content items within the bookmarking system and dividing by the sum total of the number of occurrences of each of the two tags in the entire bookmarking system.

In a further aspect of the system, a representation of the relative strength between the tags in a bookmarking system is provided to users of the system. The representation can be provided in a variety of forms. It can include tags having varied size, weight, style, color, or face of font dependent on relative strength of the tags. The representation can include tags having lines disposed between tags of common assignment, wherein the lines have varying width or color to indicate the direction of relationships between tags of common assignment. It can include tags having relationships whose relative strength is above a system or user-defined threshold.

In yet another embodiment of the invention, a computer program product encoded in a computer readable medium for instructing a system to relate tags in a collaborative bookmarking system is provided wherein the collaborative bookmarking system includes a plurality of tags applied to content items by a plurality of users, the program code configured to cause the computer to perform the method including examining all the tags that are applied to all the content items, determining whether two tags have been assigned to the same content item, and if two tags have been assigned to the same content item, computing the relative strength of each of the two tags with respect to each other.

In an aspect of the computer program product, the relative strength is computed by counting the number of occurrences of each of the two tags on all the commonly assigned content items within the bookmarking system, and dividing by the sum total of the number of occurrences of each of the two tags in the entire bookmarking system.

In a further aspect of the computer program product, the method includes determining the relative strength between all the tags in the bookmarking system that have been assigned to the same content items, wherein the relative strength is computed by counting the number of occurrences of each of two tags on all the commonly assigned content items within the bookmarking system and dividing by the sum total of the number of occurrences of each of the two tags in the entire bookmarking system.

In yet another aspect of the computer program product, the method includes providing a representation of the relative strength between the tags in a bookmarking system, wherein the representation can include (a) tags having varied size, weight, style, color, or face of font dependent on relative strength of the tags; (b) tags having lines disposed between tags of common assignment, wherein the lines have varying width or color to indicate the direction of relationships between tags of common assignment; or (c) tags having relationships whose relative strength is above a system or user-defined threshold.

BRIEF DESCRIPTION OF THE SEVERAL VIEWS OF THE DRAWINGS

The present invention will be more fully understood and appreciated by reading the following Detailed Description in conjunction with the accompanying drawings, in which.

DETAILED DESCRIPTION

Embodiments of the invention provide a system and method for discovering related topics in a collaborative bookmarking application.

Figure 1:
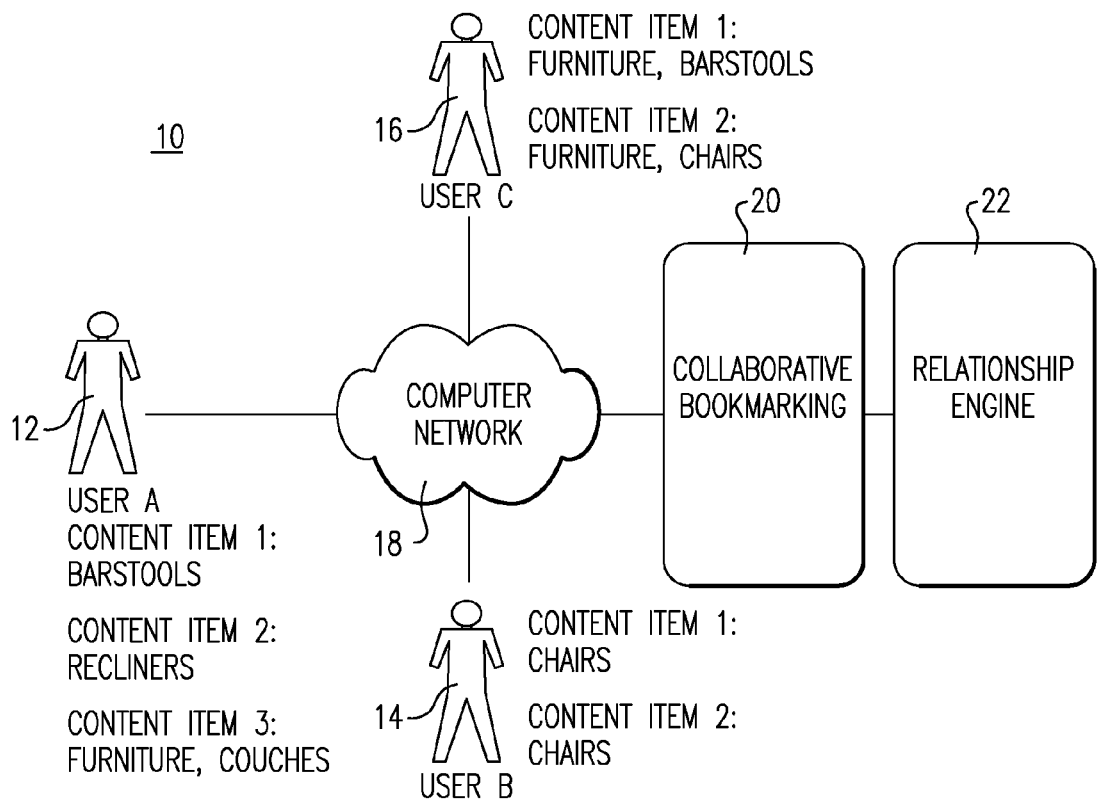
FIG. 1 shows a schematic diagram of an embodiment of a system of the invention.

Reference is made to FIG. 1, which shows an embodiment of a system 10 for discovering related topics in a collaborative bookmarking application. A series of users 12, 14 and 16 are shown, although the number of users is not limited to any set number, and as many users as possible may utilize system 10. Users 12, 14 and 16 are linked to a computer network 18. Network 18 may be a private intranet, such as a company intranet, or the public internet. Network 18 is linked to a collaborative bookmarking server 20, wherein all the tags are accessed and searched by users of system 10. Collaborative bookmarking server 20 also receives new tags from users on various content that the users are viewing. Relationship engine 22 takes the tags as input and computes the relationships between the tags by examining the tags that are applied to a content item. Relationship engine 22 then computes the relative strength of the relationships between tags by calculating the number of times that two tags appear in common across all the tagged content within the collaborative bookmarking database 20. This number is then divided by the total number of times that the tags appear within the entire collaborative bookmarking database 20 to provide a number that represents the strength of the relationships between the tags in the bookmarking system. This helps a user of the system in searching by providing a focused means of identifying topics (tags) and thus content items that are relevant to the user's topic of inquiry. This in turn enables the user to selectively broaden or narrow their search to content items that are more general or more specific to the user's topic of inquiry as indicated by the strength of the relationships derived by the invention.

In FIG. 1, Content Item 1 is tagged by users 12, 14 and 16 with the tags i) barstools, ii) furniture and barstools, and iii) chairs, respectively. Content Item 2 is tagged by users 12, 14 and 16 with the tags i) recliners, ii) furniture and chairs, and iii) chairs, respectively. Content Item 3 is tagged by user 12 with the tags i) furniture and couches. Table 1 below illustrates the aggregate appearance counts for the tags assigned to each of the three content items by the users in the collaborative bookmarking system 10.

TABLE 1

Aggregate and total number of appearances for assigned tags within the collaborative bookmarking solution.

| Content Item | Tag | | | | |
|---|---|---|---|---|---|
| | Barstools | Chairs | Couches | Furniture | Recliners |
| 1 | 2 | 1 | 0 | 1 | 0 |
| 2 | 0 | 2 | 0 | 1 | 1 |
| 3 | 0 | 0 | 1 | 1 | 0 |
| Appearances | 2 | 3 | 1 | 3 | 1 |

The number of times that each tag appears in relation to the other tags in system 10 is calculated. This is performed by taking all content items where a tag occurs, totaling the number of for all other tags that occur for those content items. For example, in FIG. 1, the tag "chairs," occurs in content items 1 and 2. In content items 1 and 2, there are two occurrences of the tag "barstool," two occurrences of the tag "furniture" and one occurrence of the tag "recliner." This is an intermediate step before calculating the strength metric between related topics. Table 2 below documents the number of times that each tag appears in relation to the other tags.

TABLE 2

Cross-reference of tag appearances relative to other tags.

| | Sum of Occurrences of Tag With Each Tag in the List of Tags | | | | |
|---|---|---|---|---|---|
| List of Tags | Barstools | Chairs | Couches | Furniture | Recliners |
| Barstools | | 1 | 0 | 1 | 0 |
| Chairs | 2 | | 0 | 2 | 1 |
| Couches | 0 | 0 | | 1 | 0 |
| Furniture | 2 | 3 | 1 | | 1 |
| Recliners | 0 | 2 | 0 | 1 | |

The relative strength of the relationships between pairs of tags is calculated by dividing each entry in Table 2 by the total number of appearances of the two tags across all content items using the algorithm:

$$Strength_{relative} = \frac{Common\ occurrences_{Tag1:Tag2}}{(Total\ Occurences_{Tag1} + Total\ Occurences_{Tag2})}$$

For example, for the strength of the relationship from chairs to barstools is calculated as follows: (number of occurrences the tag "chairs" has in common with the tag "barstools") divided by (number of appearances of the of the tag "barstools") plus (number of appearances of the tag "chairs") or 2/(2+3)=0.4. Similarly, the strength of the relationship from barstools to chairs is 1/(2+3)=0.2 The following Table 3 displays the relative strength of the relationships between related tags.

TABLE 3

Relative strength of the relationships between related tags.

| | Relative Strength | | | | |
|---|---|---|---|---|---|
| List of Tags | Barstools | Chairs | Couches | Furniture | Recliners |
| Barstools | | 0.2 | 0.0 | 0.2 | 0.0 |
| Chairs | 0.4 | | 0.0 | 0.3 | 0.3 |
| Couches | 0.0 | 0.0 | | 0.3 | 0.0 |
| Furniture | 0.4 | 0.5 | 0.3 | | 0.3 |
| Recliners | 0.0 | 0.5 | 0.0 | 0.3 | |

Figure 2:
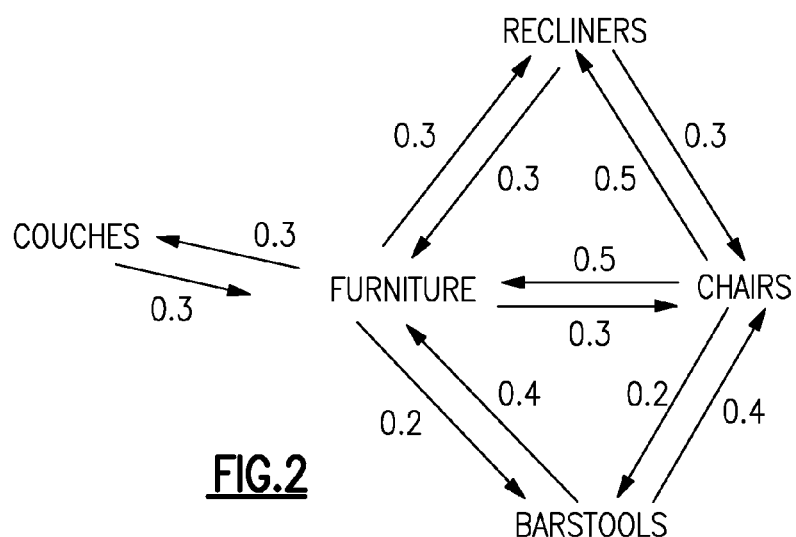
FIG. 2 shows a computational diagram of the relationship among a plurality of tags.

Reference is made to FIG. 2, which shows a graphic representation of the topics within collaborative bookmarking system 10 of FIG. 1. The relative strengths of the relationships between the tags is shown. A user using collaborative bookmarking system 10 is able to quickly determine which tags to select and how to narrow or broaden his search by viewing FIG. 2.

The strength of the relationships between tags may be represented by (i) varying the size, weight, style, color, or face of font used to render tags related to the user's currently selected tag; (ii) varying the width, or color of lines used to indicate the direction of relationships; (iii) a graph is filtered to only show relationships whose relative strength is above a system or user-defined threshold.

Figure 3:
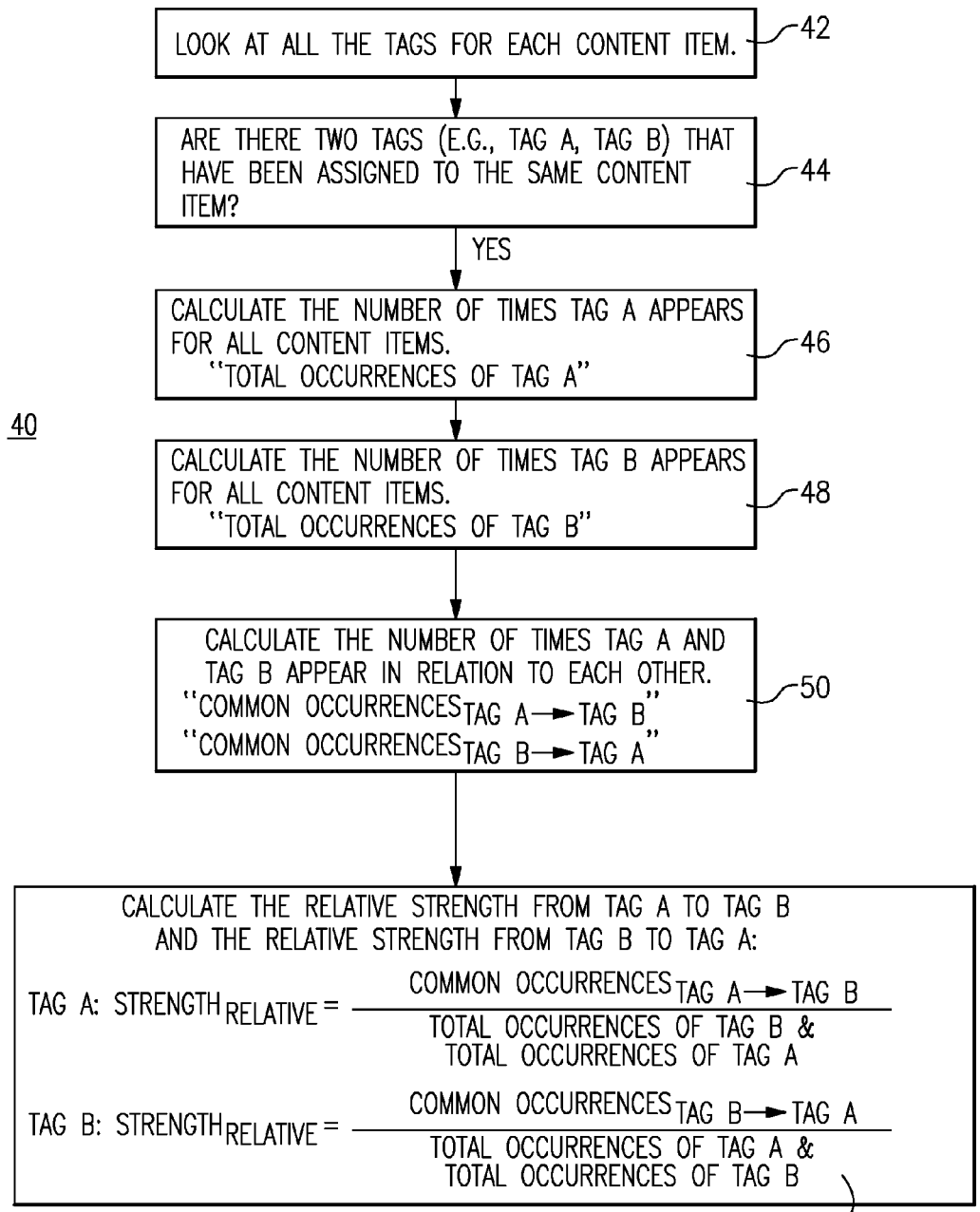
FIG. 3 shows a flow chart of an embodiment of a method of the invention.

FIG. 3 shows the logic 40 of system 10. At step 42, the tags for all content items are viewed. At step 44, a query asks if there are two tags, for example, Tag A and Tag B, that have been assigned to the same content item. If yes, the process continues, and at step 46, all content items are viewed and the number of times that Tag A appears is calculated ("total occurrences of Tag A"). At step 48, all content items are viewed and the number of times that Tag B appears is calculated ("total occurrences of Tag B"). At step 50, the number of times that Tag A and Tag B appear in relation to each other is calculated ("common occurrences of Tag A→Tag B" and common occurrences of Tag B→Tag A"). At step 52, the relative strength of Tag A with respect to Tag B is calculated by taking the common occurrences of Tag A→Tag B from step 50 and dividing by the sum total of the total occurrences of Tag B from step 48 and the total occurrences of Tag A from step 46. The relative strength of Tag B with respect to Tag A is also calculated at step 52 by taking the common occurrences of Tag B→Tag A from step 50 and dividing by the sum total of the total occurrences of Tag A from step 46 and the total occurrences of Tag B from step 48. The process may be continued for all tags in the bookmarking system, to determine the relative strength of all tags that are commonly assigned to content items. The method described in FIG. 3 can be a batch implementation or it can be implemented as a dynamic process that integrates the computation of the total occurrences and the relative strengths as the items are tagged.

It should be mentioned that the relationship engine exploits the large number of users that typically use a collaborative bookmarking solution. As multiple users tag a common piece of content it is invariable that the users will use both common and different tags that represent their individual categorizations of the content. The relationship engine exploits these variations to derive relationships between tags and display those relationships to end users of the collaborative bookmarking system. This enables users to selectively narrow or broaden their searches to significantly reduce the time it takes them to locate content relevant to their interests.

The system may be implemented using logical software components that are installed onto physical servers. A component can be implemented by a single instance of an application or through multiple installations of one or more applications. Components can be installed on any number of physical servers, i.e. the components may be installed on separate servers, collocated on a single server, or installed separately and collocated in any combination of the two options. In reference to FIG. 1, lines between the components represent logical communication paths, likely implemented using a computer network and clouds represent logical computer networks comprised of a variety of networking components and persons represent users of the collaborative bookmarking solution.

Moreover, the relationship engine can be is integrated into the collaborative bookmarking system as functional subset or via a defined extension mechanism; it can be integrated as a functional subset or extension into a storage subsystem such as a computer database that supports the collaborative bookmarking solution; it can be integrated into a knowledge management or relationship discovery component as a functional subset or via a defined extension mechanism.

In a further embodiment, the method of an embodiment herein may be implemented within or between one or more computer systems, by executing computer-readable program code stored on computer-readable media. The computer-readable media may include, for example, any number or mixture of fixed or removable media (such as one or more fixed disks, random access memories (RAMs), read-only memories (ROMs), or compact discs), at either a single location or distributed over a network. The computer-readable program code may include, for example, instructions embodied in software or firmware.

The computer-readable program code may include various components, such as program code, code to display a user interface, code to set up a collaborative bookmarking system to include content items, code to collaborate tags in a bookmarking system that are applied to the content items, code to examine all the tags that are applied to all the content items, code to determine whether two tags have been assigned to the same content item, code to compute the relative strength of each of the two tags with respect to each other, code to compute the relative strength by counting the number of occurrences of each of the two tags on all the commonly assigned content items within the bookmarking system, and dividing by the sum total of the number of occurrences of each of the two tags in the entire bookmarking system, and code to determine the relative strength between all the tags in the bookmarking system that have been assigned to the same content items.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A method of collaborating tags in a bookmarking system wherein the bookmarking system comprises a plurality of tags applied to a plurality of content items by a plurality of users, wherein the plurality of tags comprise at least a first type of tag and a second type of tag, comprising:
    examining, by a processor, all the tags that are applied to all the content items;
    determining, by the processor, whether at least said first type and said second type of tag have been assigned to at least one of said plurality of content items;
    computing, by the processor, if at least said first type and said second type of tag have been assigned to at least one of said plurality of content items, a relative strength of said first type of tag with respect to said second type of tag, wherein the relative strength is computed by counting the number of times said second type of tag was assigned to the at least one of said plurality of content items by the plurality of users, and dividing by the sum total of the number of times said first type of tag was assigned to any content item in the entire bookmarking system by the plurality of users plus the number of times said second type of tag was assigned to any content item in the entire bookmarking system by the plurality of users;
    filtering out each relative strength that is below a system or user-defined threshold;
    providing a visual representation of the plurality of tags; and
    providing a visual representation of each relative strength between the tags in the bookmarking system that is above the system or user-defined threshold.

2. The method of claim 1 further comprising determining relative strengths between all the tags in the bookmarking system that have been assigned to one of said plurality of content items.

3. The method of claim 1 wherein the representation comprises tags having varied size, weight, style, color, or face of font dependent on relative strengths of the tags.

4. The method of claim 1 wherein the representation comprises tags having lines disposed between tags of common assignment, wherein the lines have varying width or color to indicate a direction of relationships between tags of common assignment.

5. A system for collaborating tags in a bookmarking system wherein the bookmarking system comprises a plurality of tags applied to a plurality of content items by a plurality of users, wherein the plurality of tags comprise at least a first type of tag and a second type of tag, comprising:
    a computer, said computer comprising a user interface;
    a collaborative bookmarking database linked to the user interface, wherein users utilize the user interface to apply tags to said plurality of content items;
    a relationship database linked to the collaborative bookmarking database, wherein the relationship database computes a relative strength of said first type of tag applied to at least one of said plurality of content items with respect to said second type of tag applied to the at least one of said plurality of content items by counting the number of times said second type of tag was assigned to the at least one of said plurality of content items by the plurality of users, and dividing by the sum total of the number of times said first type of tag was assigned to any content item in the entire bookmarking system plus the number of times said second type of tag was assigned to any content item in the entire bookmarking system, further wherein the relationship database filters out each relative strength that is below a system or user-defined threshold, and further wherein the relationship database provides a visual representation of the plurality of tags and provides a visual representation of each relative strength between the tags in the bookmarking system that is above the system or user-defined threshold.

6. The system of claim 5 wherein the system determines relative strengths between all the tags in the bookmarking system that have been assigned to one of said plurality of content items.

7. The system of claim 6 wherein the representation comprises tags having varied size, weight, style, color, or face of font dependent on relative strengths of the tags.

8. The system of claim 5 wherein the representation comprises tags having lines disposed between tags of common assignment, wherein the lines have varying width or color to indicate a direction of relationships between tags of common assignment.

9. A computer program product comprising program code encoded in a non-transitory computer readable medium for instructing a system to relate tags in a collaborative bookmarking system wherein the bookmarking system comprises a plurality of tags applied to a plurality of content items by a plurality of users, wherein the plurality of tags comprise at least a first type of tag and a second type of tag, the program code configured to cause a computer to perform the method comprising:
    examining all the tags that are applied to all the content items;
    determining whether at least said first type and said second type of tag have been assigned to at least one of said plurality of content items;

computing, if at least said first type and said second type of tag have been assigned to the same at least one of said plurality of content items, a relative strength of said first type of tag with respect to said second type of tag, wherein the relative strength is computed by counting the number of times said second type of tag was assigned to the at least one of said plurality of content items by the plurality of users, and dividing by the sum total of the number of times said first type of tag was assigned to any content item in the entire bookmarking system by the plurality of users plus the number of times said second type of tag was assigned to any content item in the entire bookmarking system by the plurality of users;

filtering out each relative strength that is below a system or user-defined threshold;

providing a visual representation of the plurality of tags; and providing a visual representation of each relative strength between the tags in the bookmarking system that is above the system or user-defined threshold.

10. The computer program product of claim 9 wherein the method further comprises determining relative strengths between all the tags in the bookmarking system that have been assigned to one of said plurality of content items.

11. The computer program product of claim 9, wherein the representation comprises (a) tags having varied size, weight, style, color, or face of font dependent on relative strengths of the tags; or (b) tags having lines disposed between tags of common assignment, wherein the lines have varying width or color to indicate a direction of relationships between tags of common assignment.

* * * * *